United States Patent
Kyue et al.

(10) Patent No.: US 8,390,311 B2
(45) Date of Patent: Mar. 5, 2013

(54) APPARATUS FOR CLOCKED POWER LOGIC AGAINST POWER ANALYSIS ATTACK

(75) Inventors: Kim Dong Kyue, Seoul (KR); Choi Byong-Deok, Seoul (KR)

(73) Assignee: IUCF-HYU (Industry-University Cooperation Foundation Hanyang University) (KR)

( * ) Notice: Subject to any disclaimer, the term of this patent is extended or adjusted under 35 U.S.C. 154(b) by 0 days.

(21) Appl. No.: 13/023,130

(22) Filed: Feb. 8, 2011

(65) Prior Publication Data

US 2012/0200313 A1 Aug. 9, 2012

(51) Int. Cl.
H03K 19/003 (2006.01)

(52) U.S. Cl. ............................................ 326/8; 326/98

(58) Field of Classification Search .................. None
See application file for complete search history.

(56) References Cited

U.S. PATENT DOCUMENTS

| | | | |
|---|---|---|---|
| 5,859,548 A * | 1/1999 | Kong | 326/113 |
| 6,009,021 A * | 12/1999 | Kioi | 365/189.06 |
| 7,362,140 B2 * | 4/2008 | Hassoune et al. | 326/115 |
| 2004/0195625 A1 * | 10/2004 | Ichikawa | 257/347 |
| 2005/0179461 A1 * | 8/2005 | Menke et al. | 326/34 |
| 2007/0257713 A1 * | 11/2007 | Engl et al. | 327/113 |

FOREIGN PATENT DOCUMENTS

| KR | 1020060056743 | 8/2006 |
|---|---|---|
| KR | 1020070009920 | 1/2007 |
| KR | 1020100053507 | 5/2010 |

OTHER PUBLICATIONS

DPA-Resistant Logic Gates and Secure Designs of SEED and SHA-1, Yoo-Jin Baek, Samsung Electronics 2008.
Symmetric Adiabatic Logic Circuits Against Differential Power Analysis, Byong-Deok Choi et al., ETRI Journal, vol. 32, No. 1, pp. 166-168, Feb. 9, 2010.
Symmetric Discharge Logic against Differential Power Analysis, Lee et al, IEICE Trans. Fundamentals, vol. E90-A, No. 1 Jan. 2007.

* cited by examiner

*Primary Examiner* — Crystal L Hammond
(74) *Attorney, Agent, or Firm* — Levenfeld Pearlstein, LLC

(57) ABSTRACT

A logic apparatus secure against a power analysis attack is disclosed. The logic apparatus may include a clocked power logic to recover and reuse at least a part of charges supplied during a single clock operation; a first device block connected to the clocked power logic to remove a parasitic capacitance difference in the clocked power logic, and a second device block to readjust remaining charges in each node of the clocked power logic after a single clock operation.

17 Claims, 12 Drawing Sheets

APPARATUS FOR CLOCKED POWER LOGIC AGAINST POWER ANALYSIS ATTACK

BACKGROUND

1. Field of the Invention

The present invention relates to a logic circuit capable of preventing a side-channel attack, and more particularly, to a clocked power logic circuit being secure against a power analysis attack.

2. Description of the Related Art

In the past, an encryption algorithm using a secret key was considered significant for security of an encryption system. Therefore, researches into security of the encryption system have been focused on protection of the secret key and the encryption algorithm from a direct attack.

However, practically, the encryption system is vulnerable to indirect attacks caused by measurement of physical values such as a plurality of input and output signals, for example signals regarding voltage or current value, and various leakage information such as electromagnetic wave radiation, power variation, and the like.

A non-invasive attack is defined as an attack that incapacitates the encryption system by measuring the physical values without depacking a chip. In particular, among non-invasive attacks, a side-channel attack incapacitates the encryption system using an input signal, an output signal, and other additional physical information.

Attacks to the encryption system may be interpreted as analyses of an operation of each module in the encryption system. Depending on the analysis method, the side-channel attacks may be classified into a timing attack, a power consumption analysis attack, and a differential electromagnetic attack. The timing attack analyzes the encryption algorithm and/or a secret key using a time difference according to operations. The power consumption analysis attack analyzes the encryption algorithm by measuring power consumed during encryption and decryption. The differential electromagnetic attack analyzes the encryption algorithm by measuring leakage of an electromagnetic wave during the operation.

Among the side-channel attacks, the power consumption analysis attack which is simply called a power analysis attack may be separated into a simple power analysis (SPA) performing simple analysis by measuring a current of a power supply during an operation, a differential power analysis (DPA) statistically analyzing a current, and a high-order DPA (HO-DPA) performing high-order analysis through combination of various DPAs.

Countermeasures against the side-channel attack includes a hiding method that equalizes or randomizes power consumption quantity to remove relationships between power consumption and data such as the secret key, and a masking method that randomizes intermediate data during an operation to remove the relationships between power consumption and data such as the secret key.

The hiding method may be achieved by a software approach and a hardware approach. The hardware approach is capable of hiding relationships between an operation type and a current value of a power supply and also capable of removing a difference in the current value caused according to patterns of input signals and output signals, thereby gradually drawing attentions.

Especially, interests are increasing in methods for achieving the hiding to prevent the power analysis attacks in unit of cell. The methods may include a dual-rail logic implementation method that always maintains an input signal and output signal of the cell as a set (1, 0), a precharge logic method that sets the output signal to 1 or 0 before input of the input signal, and a dual-rail precharge logic method that is a combination of the previous two methods.

Power consumption reduction is a critical issue in electronic systems including the encryption. A clocked power logic is a circuit developed to reduce power consumption by recovering at least a part of charges used in every operation of every clock by using a power supply Vclk having a periodic waveform rather than using a fixed voltage power supply $V_{DD}$, as a power supply of an apparatus for logic operation.

In the following description, the clocked power logic will be explained, by way of example, with respect to an adiabatic logic including an efficient charge recover logic (ECRL), a positive feedback adiabatic logic (PFAL), a 2N-2N2P, and the like as logic family.

SUMMARY

An aspect of the present invention provides a clocked power logic which is secure against a power analysis attack while considerably reducing power consumption.

An adiabatic logic will be described as an example of the clocked power logic.

Another aspect of the present invention provides a clocked power logic which forms a current path such that a constant current is consumed in the clocked power logic regardless of an input signal and output signal.

Still another aspect of the present invention provides a clocked power logic which removes a difference in a current pattern caused by variation of an input signal and output signal, by rearranging charges of before and after an operation of the clocked power logic.

According to an aspect of the present invention, there is provided a logic apparatus secure against a power analysis attack, including a clocked power logic to recover and reuse at least a part of charges supplied during a single clock operation, a first device block connected to the clocked power logic to adjust a current path of the clocked power logic so that a pattern of a power supply current is constant regardless of input and output signals, and a second device block to make uniform distribution of charges by readjusting remaining charges in each node of the clocked power logic after the clock operation.

The first device block may include a dummy transistor which always maintains an off state.

The second device block may include at least one charge sharing element. Also, the second device block may include at least one discharge element or include at least one charge recovery element.

The clocked power logic may be any one of an efficient charge recovery logic (ECRL) type, a 2N-2N2P type, and a positive feed-back adiabatic logic (PFAL) type. However, those types of the adiabatic logic are suggested only as exemplary embodiments of the clocked power logic, not to limit the scope of the present invention.

Although the adiabatic logic is explained as an example of the clocked power logic throughout the detailed description, the present invention does not cover only the adiabatic logic. That is, various other types of clocked power logic may be included without departing the scope of the invention.

The clocked power logic may perform any one of logic operations NAND, NOR, XOR, and XNOR.

According to another aspect of the present invention, there is provided a logic apparatus secure against a power analysis attack, including a clocked power logic to recover and reuse at least a part of charges supplied during a single clock operation, the clocked power logic comprising a circuit that forms a current path for adjusting power consumption to be constant, and a second device block to make uniform distribution of charges by readjusting remaining charges in each node of the clocked power logic after the single clock operation.

The clocked power logic may be a 2N-2N2P type.

The second device block may include at least one charge sharing element, at least one discharge element, or at least one charge recovery element.

According to another aspect of the present invention, there is provided a logic apparatus secure against a power analysis attack, including an efficient charge recovery logic (ECRL) type clocked power logic to perform NAND operation of a first input signal and a second input signal by using two n-type metal oxide semiconductor (NMOS) pull-down networks having duality, a first device block connected to a first output node and a second output node of the clocked power logic to adjust a current path between the two NMOS pull-down networks so that power consumption becomes constant regardless of input and output signals, and a second device block to redistribute charges of each node in the logic apparatus after the NAND operation.

EFFECT

According to embodiments of the present invention, since a current path is formed such that a current consumed in a clocked power logic is constant regardless of an input signal and output signal, a side-channel attack, especially a power analysis attack, may be prevented.

Additionally, according to embodiments of the present invention, since charges are rearranged before and after an operation of the clocked power logics, a difference in a current pattern caused by the input signal and output signal is removed. Accordingly, the side-channel attack may be prevented.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
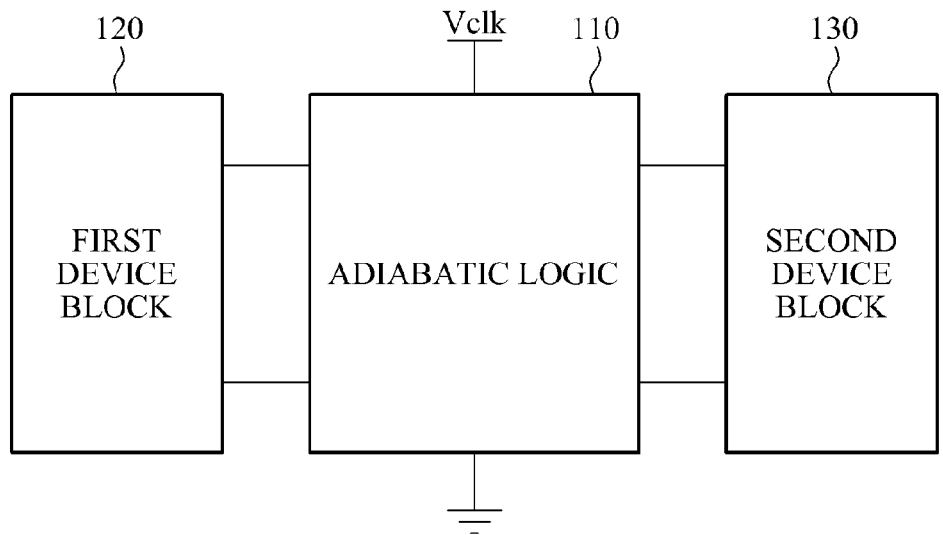
FIG. 1 is a diagram illustrating a logic apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a logic apparatus 100 according to an embodiment of the present invention.

Hereinafter, an adiabatic logic will be described as an exemplary embodiment of the clocked power logic. That is, a description will be made about a case where the clocked power logic is an adiabatic logic.

However, as aforementioned, since the adiabatic logic is described herein only by way of example, various other types of the clocked power logic will be included in embodiments of the present invention.

For example, an adiabatic logic 110 illustrated as an embodiment of the clocked power logic in FIG. 1 will be understood only as an example of a clocked power logic even without particular notice.

The logic apparatus 100 may include an adiabatic logic 110, a first device block 120, and a second device block 130.

The adiabatic logic 110 may be supplied with power from a power supply Vclk that increases and decreases a voltage according to time, instead of from a fixed voltage power supply.

The power supply Vclk generates an output node voltage of a logic operation by supplying charges to the adiabatic logic 110 every clock (evaluate phase and hold phase), and recovers at least a part of the supplied charges (recovery phase), thereby reducing energy dissipation. The adiabatic logic refers to a logic circuit that works in the above manner.

The adiabatic logic 110 may be utilized as at least a part of a module in the encryption system. During this, physical data such as a value of current being supplied or recovered from the power supply Vclk to the encryption system may be measured. Also, through the analysis of the physical data, an operation type of an internal module may be detected by the power analysis attack such as the SPA and the DPA.

The operation type may be detected when a current pattern is varied according to a difference in a logic level of an input signal and output signal. According to embodiments of the present invention, the current pattern is constant or just unnoticeably varied regardless of input data and output data. Therefore, the side-channel attack by the power analysis attack may be prevented.

The measurable difference in the input current and output current according to variation of the input signal and the output signal of the logic operation may be caused by various factors, especially, by two main factors. One is asymmetry of the operation circuit. The other is charge imbalance between nodes, occurring due to a difference in parasitic capacitance charged and discharged. The difference is generated since a current path formed in the circuit is changed according to the input signal and the output signal of the logic operation.

According to the embodiment, since the first device block 120 is connected to the adiabatic logic 110 performing a logic operation, power consumption of the adiabatic logic 110 may become constant. In addition, since the second device block 130 is connected to the adiabatic logic 110, charge balance between nodes in the circuit may be achieved.

According to the embodiment, the structure of the first device block 120 may be determined by an operation equation and/or a truth table of the logic operation performed by the adiabatic logic 110.

For example, a logic equation for an "OR" logic operation may be used as suggested below.

$$Y = A + B \quad \text{[Equation 1]}$$
$$= A + B*1$$
$$= A + B*(A + Ab)$$
$$= A + A*B + Ab*B$$
$$= A(1 + B) + Ab*B$$
$$= A*A + Ab*B$$

wherein, Ab denotes "A bar" invert to a logic value A. As can be appreciated from Equation 1, a logic equation A+B=A*A+Ab*B is satisfied. In this case, a truth table commonly applied to both sides of the logic equation is as shown in Table 1.

TABLE 1

| A | B | Y |
|---|---|---|
| 0 | 0 | 0 |
| 0 | 1 | 1 |
| 1 | 0 | 1 |
| 1 | 1 | 1 |

For another example, a logic equation for an "AND" logic operation is suggested in Equation 2 below.

$$Y = A*B \quad \text{[Equation 2]}$$
$$= 0 + (A*B)$$
$$= (Ab*0) + (A*B) \text{ or}$$
$$= (Ab*A) + (A*B)$$

Equation 2 is satisfied regardless of a value Ab. However, Ab is used in consideration of a charge trap according to respective logic equations. This will be described in further detail with reference to FIG. 2.

In Equation 2, "0" refers to a dummy transistor which is always in an off state and may be implemented by an n-type metal oxide semiconductor (NMOS) including a grounded gate.

As can be appreciated from Equation 2, a logic equation A*B=(Ab*0)+(A*B) is satisfied. A truth table commonly applied to both sides of the logic equation is as shown in Table 2.

TABLE 2

| A | B | Y |
|---|---|---|
| 0 | 0 | 0 |
| 0 | 1 | 0 |
| 1 | 0 | 0 |
| 1 | 1 | 1 |

As can be appreciated from the equations, a logic circuit consisting of a plurality of transistors such as an N-type or P-type Metal-Oxide Silicon Field Effect Transistor (NMOS or PMOS) may additionally include a few transistors which do not influence the result value.

When devices such as the plurality of transistors are thus added, asymmetry of power consumption of a circuit may be reduced. Here, the added devices may be considered as the first device block 120, respectively or entirely. A procedure of determining an internal structure of the first device block 120 will be more specifically explained hereinafter with reference to FIG. 2.

The second device block 130 may include a device for removing the imbalance between remaining charges of the nodes of the logic apparatus 100 after calculating a result value of a clock operation by the adiabatic logic 110.

For example, the second device block 130 may include a plurality of NMOSs connected between each of the nodes and a ground GND, a plurality of PMOSs connected between each of the nodes and the power supply Vclk, or a plurality of NMOSs or PMOSs connected between the nodes in the circuit.

The second device block 130 will be described in further detail with other embodiments after FIG. 2, especially with reference to FIGS. 5 through 7.

Figure 2:
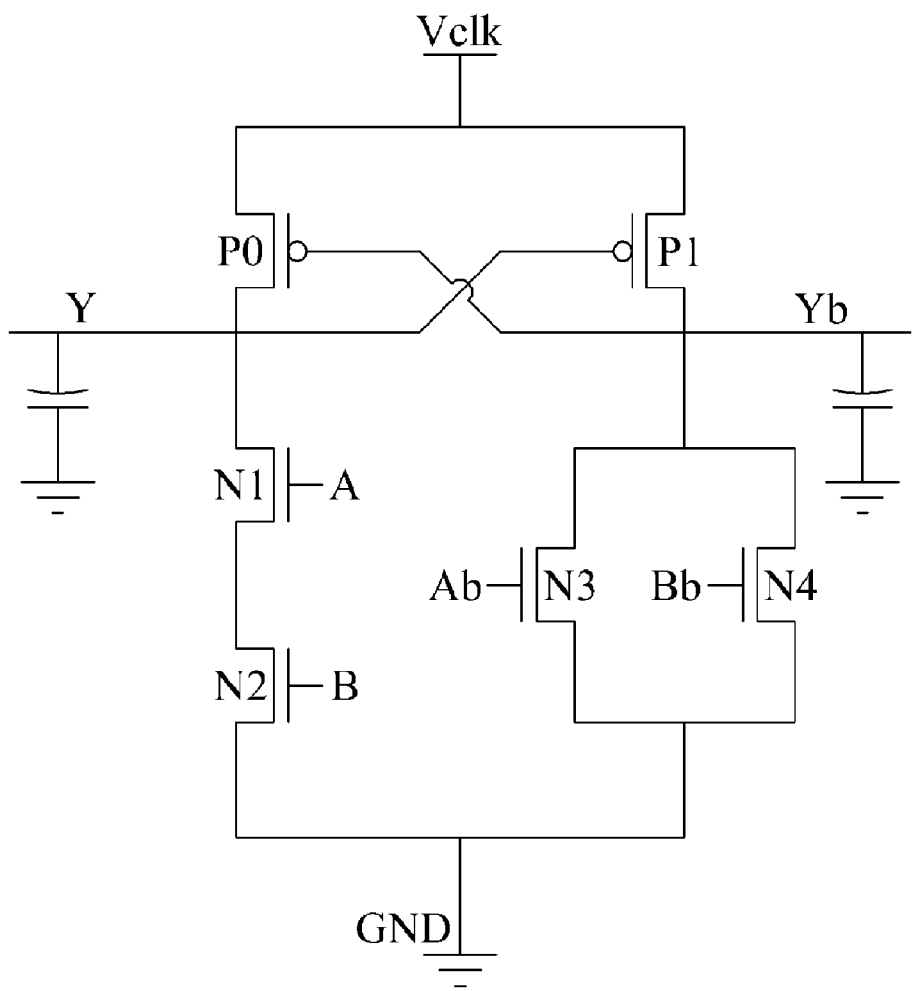
FIG. 2 is a diagram illustrating a logic apparatus in which an adiabatic logic which includes an efficient charge recover logic (ECRL) type NAND gate, according to an embodiment of the present invention.

FIG. 2 illustrates a logic apparatus in which an adiabatic logic which includes an efficient charge recover logic (ECRL) type NAND gate, according to an embodiment of the present invention.

The adiabatic logic 200 may include two pull-down networks having duality, that is, a left pull-down network and a right pull-down network. When A=1 and B=1, an NMOS N1 and an NMOS N2 pulls down a logic value of an output node Y to 0. In this case, the a PMOS P1 is turned on and an inverse terminal Yb of the output node Y becomes a power supply Vclk. Here, since Ab=0 and Bb=0, the right pull-down network is opened and a PMOS PO is turned off.

Accordingly, the adiabatic logic 200 performs an operation Y=NAND(A, B).

According to the present embodiment, the power supply Vclk includes a voltage clock having a cycle of Wait phase—Evaluate phase—Hold phase—Recovery phase. Therefore, at least a part of charges in output nodes is recovered to the power supply Vclk. As a consequence, power consumption may be reduced compared to when a fixed voltage $V_{DD}$ is used.

However, since the two pull-down networks of the adiabatic logic 200 is asymmetric, a current difference is generated according to the logic value of (A, B). That is, the logic value of A and B may be disclosed by analyzing the current pattern between the power supply Vclk and the adiabatic logic 200.

A first device block 120 and/or a second device block 130 may be further provided to decrease possibility of the disclosure, which will be described hereinafter with reference to FIGS. 3 and 4.

Figure 3:
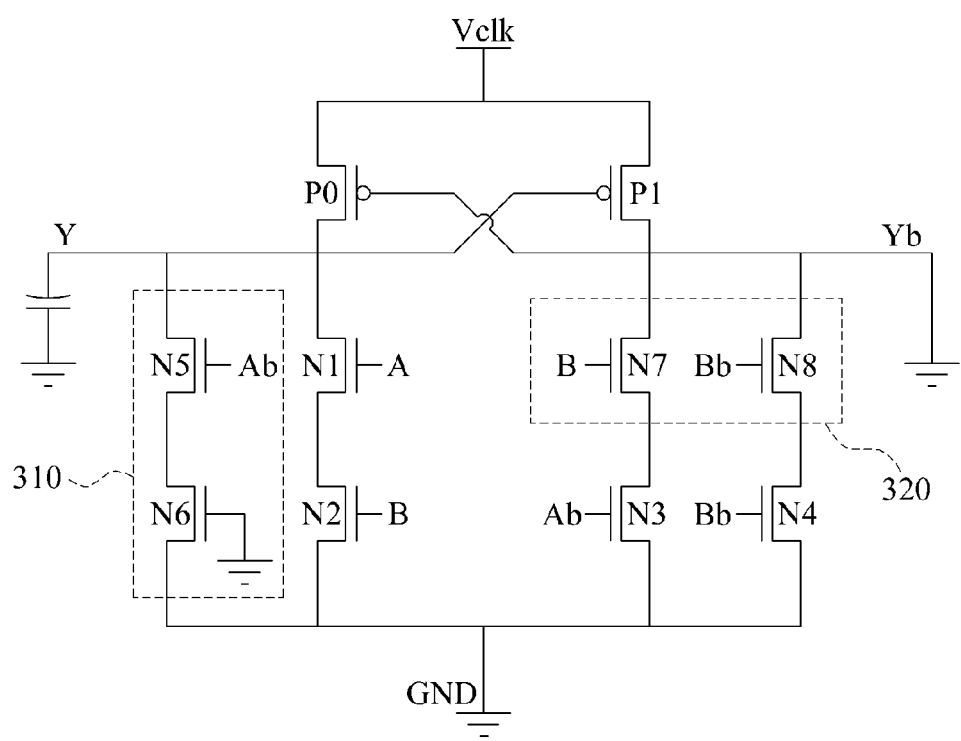
FIG. 3 is a diagram illustrating a logic apparatus in which a first device block connected to supply symmetry of the adiabatic logic of FIG. 2.

FIG. 3 illustrates a logic apparatus in which a first device block connected to supply symmetry of the adiabatic logic of FIG. 2

A block 310 which is a part of the first device block may include an NMOS transistor N5 and a dummy transistor N6 parallel-connected with a pull-down network of A*B. Referring to Equation 2, since A*B=(A*B)+(Ab*0), an output node value Y is not influenced by addition of the block 310.

A block 320 which is another part of the first device block may be connected to a pull-down network of (Ab+Bb). A transistor N7 input with B is serially connected to a transistor N3 input with Ab. A transistor N8 input with Bb is serially connected with a transistor N4 input with Bb. Ab+Bb=Ab*B+Bb*Bb may easily be derived by altering Equation 1. That is, addition of the block 320 does not influence an output node value Yb.

Accordingly, the logic apparatus 300 including the first device blocks 310 and 320 connected to the adiabatic logic 200 of FIG. 2 may have symmetry, out of the influence of a logic operation result. In other words, a capacitance connected to the node Y and a capacitance connected to the node Yb seem the same from the power supply. Since the capacitance value determines a current value supplied from the power supply, the symmetry is essential to maintain a constant current value supplied and recovered from the power supply regardless of data.

Input of Ab to the transistor N5 will be explained.

In the adiabatic logic 200 of FIG. 2, when (A, B)=(0, 0) and when (A, B)=(0, 1), a lower side of the node Y is opened while the node Yb is grounded. When (A, B)=(1, 1), a lower side of the node Yb is opened while the node Y is grounded. That is, in a node having an output value of 1, charge movement does not occur at a lower side.

However, when (A, B)=(1, 0), since the NMOS N1 disposed at a lower part of the node Y is turned on, a parasitic capacitance present in a node between the NMOS N1 and the NMOS N2 may be charged with charges. Therefore, different from in the above three cases, the lower side of the node Y having a logic level of 1 is not fully opened. Accordingly, a difference in charge quantity is caused when the current is supplied or recovered from the power supply Vclk to the circuit. As a result, a current difference is generated.

Therefore, as shown in FIG. 3, the block 310 is added to the first device block and the transistor N5 is input with Ab.

Meanwhile, the second device block 130 for redistribution or discharge of charges may be additionally connected in order to prevent the current pattern according to input data from being detected through a charge difference between respective nodes of the adiabatic logic 300 after a single clock operation.

Figure 4:
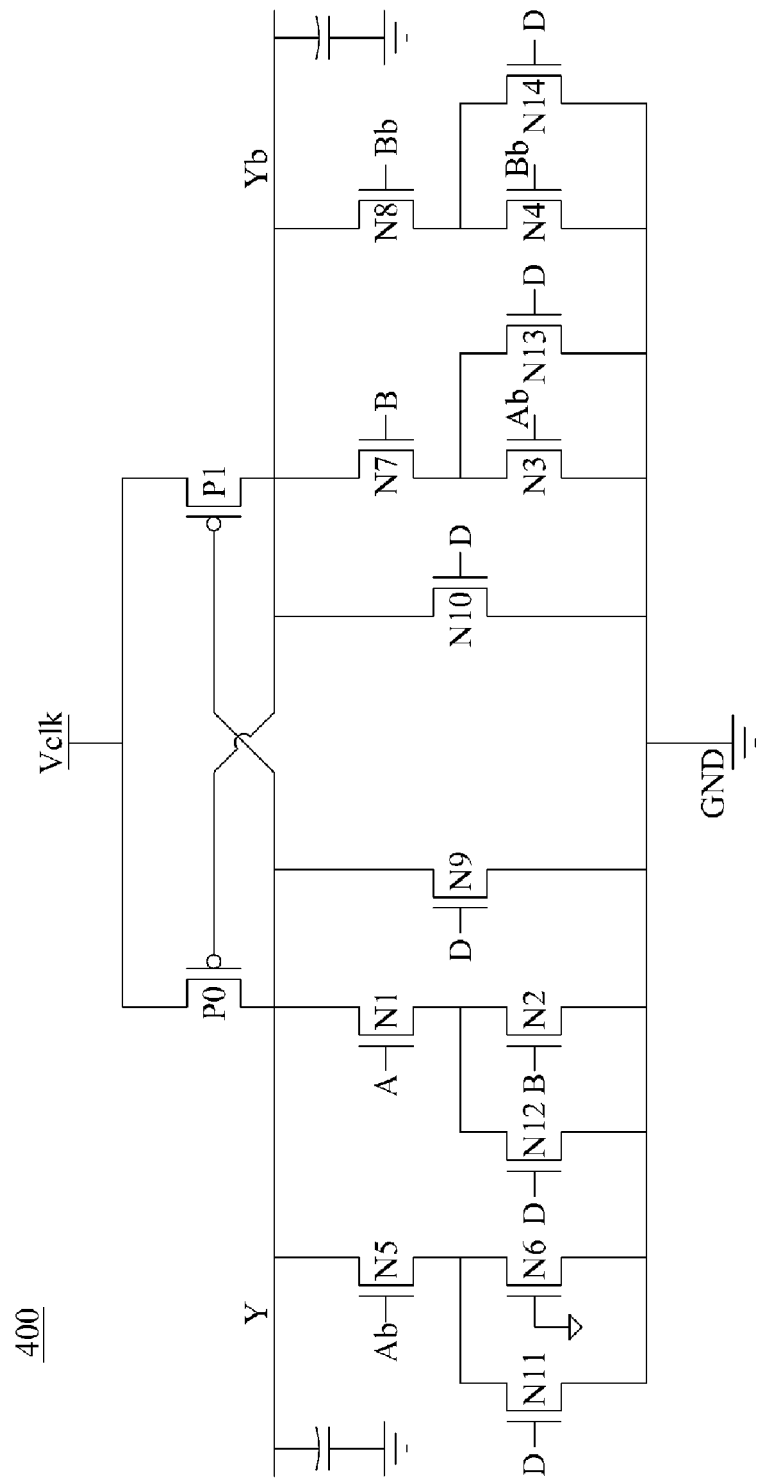
FIG. 4 is a diagram illustrating a logic apparatus in which a second device block for charge adjustment is connected to redistribute charges of each node of the logic apparatus of FIG. 3, according to an embodiment of the present invention.

FIG. 4 illustrates a logic apparatus 400 in which a second device block for charge adjustment is connected to redistribute charges of each node of the logic apparatus of FIG. 3, according to an embodiment of the present invention.

As described above, the second device block 130 may include at least one transistor. In the present embodiment, the second device block 130 includes a plurality of NMOS transistors. The NMOS transistors are configured to be input with a value D and to ground respective nodes of the logic apparatus 400. In other words, in a case where the input value D is greater than a threshold voltage of the NMOS transistor after the single clock operation of the logic apparatus 400, the respective nodes of the logic apparatus 400 are grounded. Accordingly, remaining charges of the nodes are removed. Therefore, power analysis from the outside becomes more difficult.

As described in the present embodiment, the charge imbalance between the nodes according to input data may be solved when the second device block grounds the nodes of the logic apparatus 400. However, the present invention is not limited to the suggested embodiment but may employ any structure capable of solving the charge imbalance between the nodes.

Besides the discharge method used in the embodiment, to be more specific, the charge sharing method that shares charges by disconnecting symmetric nodes, the charge recovery method that recovers charges by disconnecting the nodes and the power supply Vclk, or a combined method of the charge sharing and the charge recovery may be used.

Figure 5:
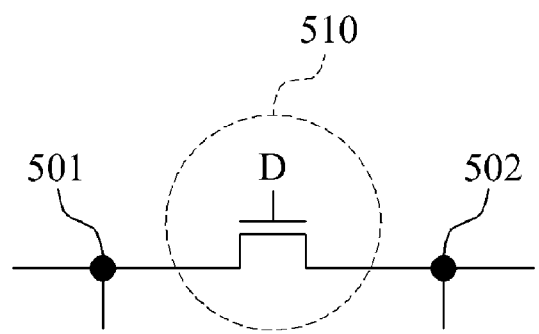
FIG. 5 is a diagram illustrating a charge sharing transistor that may be included in the second device block, according to an embodiment of the present invention.
Figure 6:
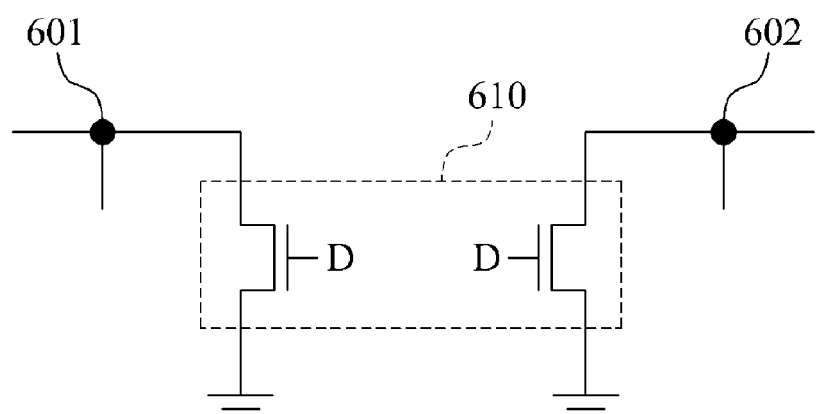
FIG. 6 is a diagram illustrating a discharge transistor that may be included in the second device block, according to an embodiment of the present invention.
Figure 7:
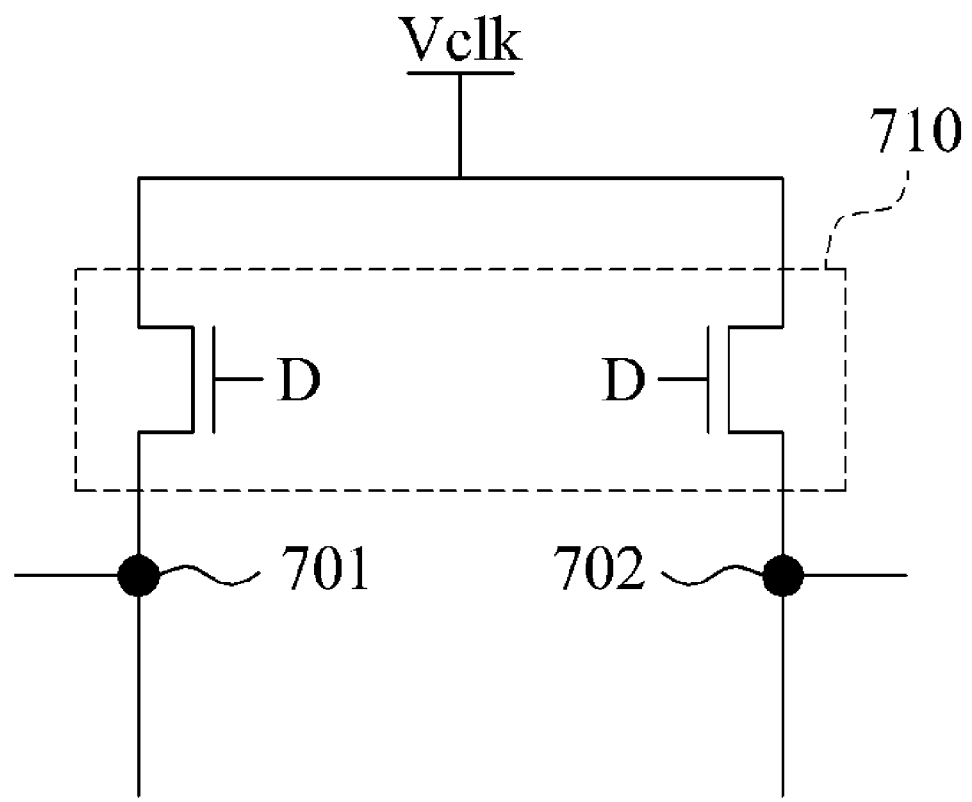
FIG. 7 is a diagram illustrating a charge recover transistor that may be included in the second device block, according to an embodiment of the present invention.

The configuration type of the second device block 130 may be understood with reference to FIGS. 5 through 7.

FIG. 5 illustrates a charge sharing transistor that may be included in the second device block 130, according to an embodiment of the present invention.

A node 501 and a node 502 may refer to two symmetric nodes in a logic apparatus. When remaining charges of the node 501 and the node 502 are different after completion of a single clock operation of the logic apparatus, the logic apparatus may be subject to a side-channel attack using power analysis from the outside.

Therefore, a charge sharing type device 510 may be provided as the second device block 130 in the logic apparatus. The charge sharing type device 510 causes a short circuit between the node 501 and the node 502 using a voltage D greater than a threshold voltage, so that charges are shared.

FIG. 6 illustrates a discharge transistor that may be included in the second device block 130, according to an embodiment of the present invention.

As in the case of FIG. 5, when remaining charges of a node 601 and a node 602 are different after completion of a single clock operation of a logic apparatus, the logic apparatus may be subject to a side-channel attack using power analysis from the outside.

Therefore, a pair of NMOS transistors 610 respectively grounding the node 601 and the node 602 by a voltage D greater than a threshold may be included in the logic apparatus as the second device block 130.

FIG. 7 illustrates a charge recover transistor that may be included in the second device block 130, according to an embodiment of the present invention.

According to the present embodiment, a node 701 and a node 702 are short-circuited with a power supply Vclk by a voltage D greater than a threshold voltage, after a single clock operation of a logic apparatus. Charges of the nodes 701 and 702 are supplemented to be equal. In this case, a block 710 may be included as the second device block 130. That is, an opposite principle to the embodiment of FIG. 6 is applied.

As described above, the second device block 130 may include any one or a combination of at least two selected from the block 510, the block 610, and the block 710. However, the present invention is not limited to the suggested configuration but may employ other configurations capable of readjusting the charge imbalance between both nodes.

Figure 8:
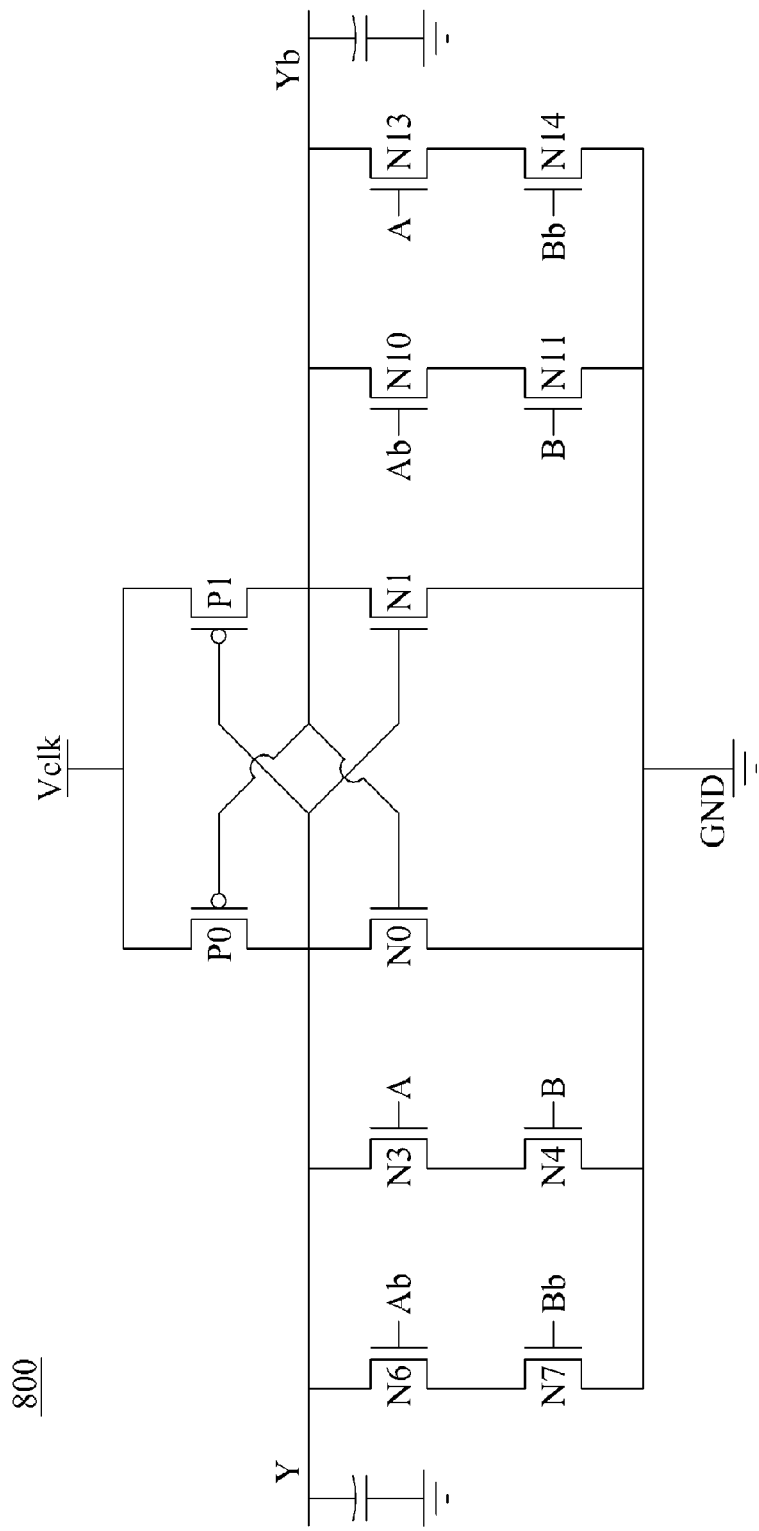
FIG. 8 is a diagram illustrating a logic apparatus in which an adiabatic logic is selected as a 2N-2N2P type XOR/XNOR gate, according to an embodiment of the present invention.

FIG. 8 illustrates a logic apparatus 800 in which an adiabatic logic is selected as a 2N-2N2P type XOR/XNOR gate, according to an embodiment of the present invention.

The XOR operation is expressed by an equation Y=Ab*B+A*Bb, and expressed using dual pull-down networks as illustrated in FIG. 8. The XNOR operation may be expressed with the same pull-down network structure except that nodes Y/Yb are the opposite to in the XOR operation.

Since symmetry of the circuit is achieved with basic structures in the logic apparatus 800, balance of a current path may be guaranteed without the first device block 120.

Figure 9:
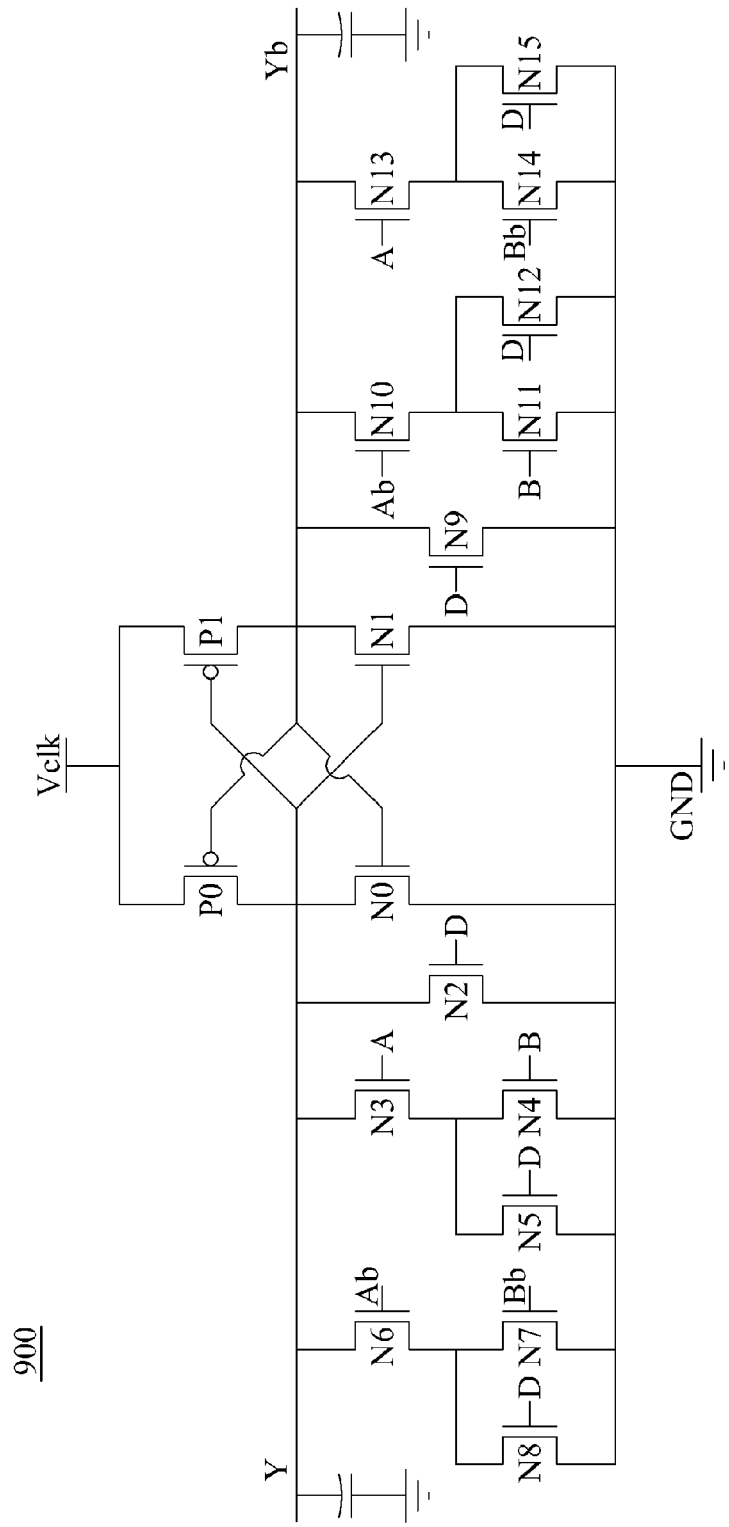
FIG. 9 is a diagram illustrating a logic apparatus in which a second device block for charge adjustment is connected to discharge charges of each node of the logic apparatus of FIG. 8.

Therefore, the logic apparatus 800 may be able to cope with the side-channel attack by power analysis with only the second device block 130 adapted to solve the charge imbalance between nodes after a clock operation. FIG. 9 shows the logic apparatus 800 including the second device block 130 connected thereto.

FIG. 9 illustrates a logic apparatus 900 in which a second device block for charge adjustment is connected to discharge charges of each node of the logic apparatus of FIG. 8.

In the present embodiment, discharge transistors are connected between each of nodes of the logic apparatus 900 and a ground. The charge transistors N2, N5, N8, N9, N12, and N15 are input with a voltage D greater than a threshold voltage after a single clock operation, thereby grounding all the nodes of the logic apparatus 900.

According to another embodiment, the second device block may consist of a discharging element, a charge sharing element, a charge recovery element, or a combination of at least two of those elements.

Figure 10:
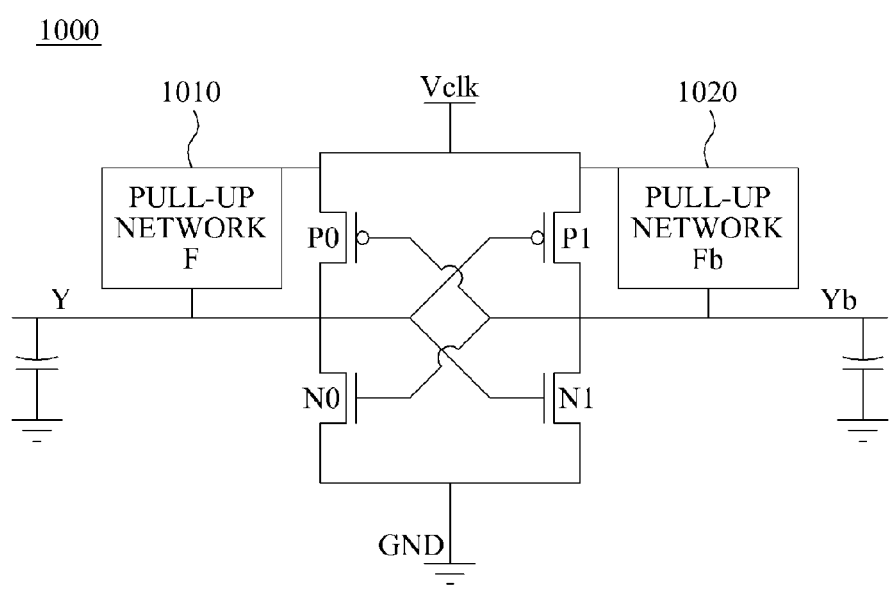
FIG. 10 is a diagram illustrating an adiabatic logic selected as a positive feed-back adiabatic logic (PFAL), according to an embodiment of the present invention.

FIG. 10 illustrates an adiabatic logic 1000 selected as a positive feed-back adiabatic logic (PFAL), according to an embodiment of the present invention.

The PFAL type adiabatic logic 1000 may include two pull-up networks F 1010 and Fb 1020 having duality, and output nodes Y and Yb in a feedback connection.

Figure 11:
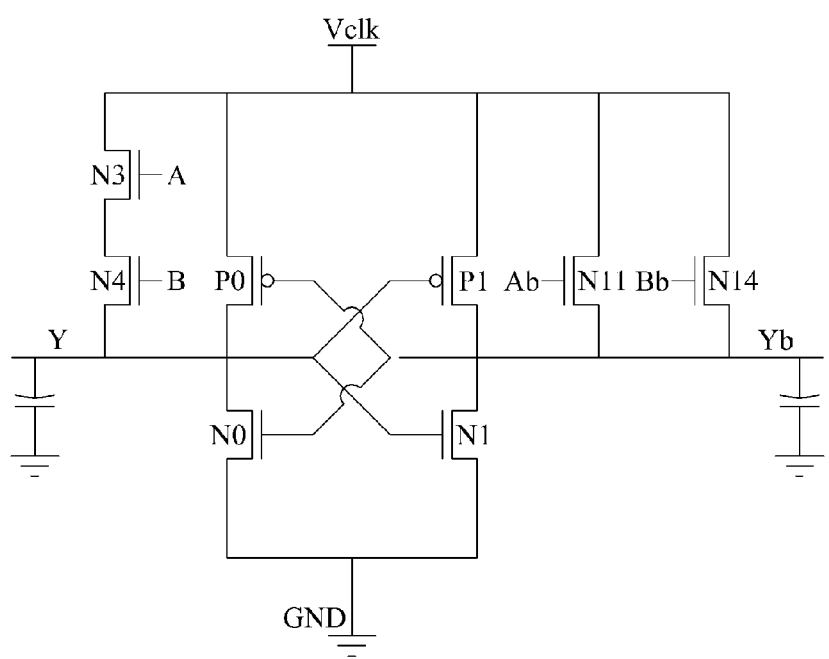
FIG. 11 is a diagram illustrating a logic apparatus in which the PFAL-type adiabatic logic of FIG. 10 serves as an operation unit that performs an NAND operation.

An example structure of the PFAL type adiabatic logic 1000 to perform an NAND operation is shown in FIG. 11.

FIG. 11 illustrates a logic apparatus 1110 in which the PFAL-type adiabatic logic of FIG. 10 serves as an operation unit performing the NAND operation.

In the dual pull-down networks, the pull-down network F may include a transistor N3 input with A and a transistor N4 input with B, the transistors N3 and N4 in a serial connection. The pull-down network Fb 1020 may include a transistor N11 input with Ab and a transistor N14 input with Bb.

In this case, since the two pull-down networks are not symmetric, a first device block 120 may need to be added to cope with the side-channel attack by power analysis from the outside. An example of such a case will be described with reference to FIG. 12.

Figure 12:
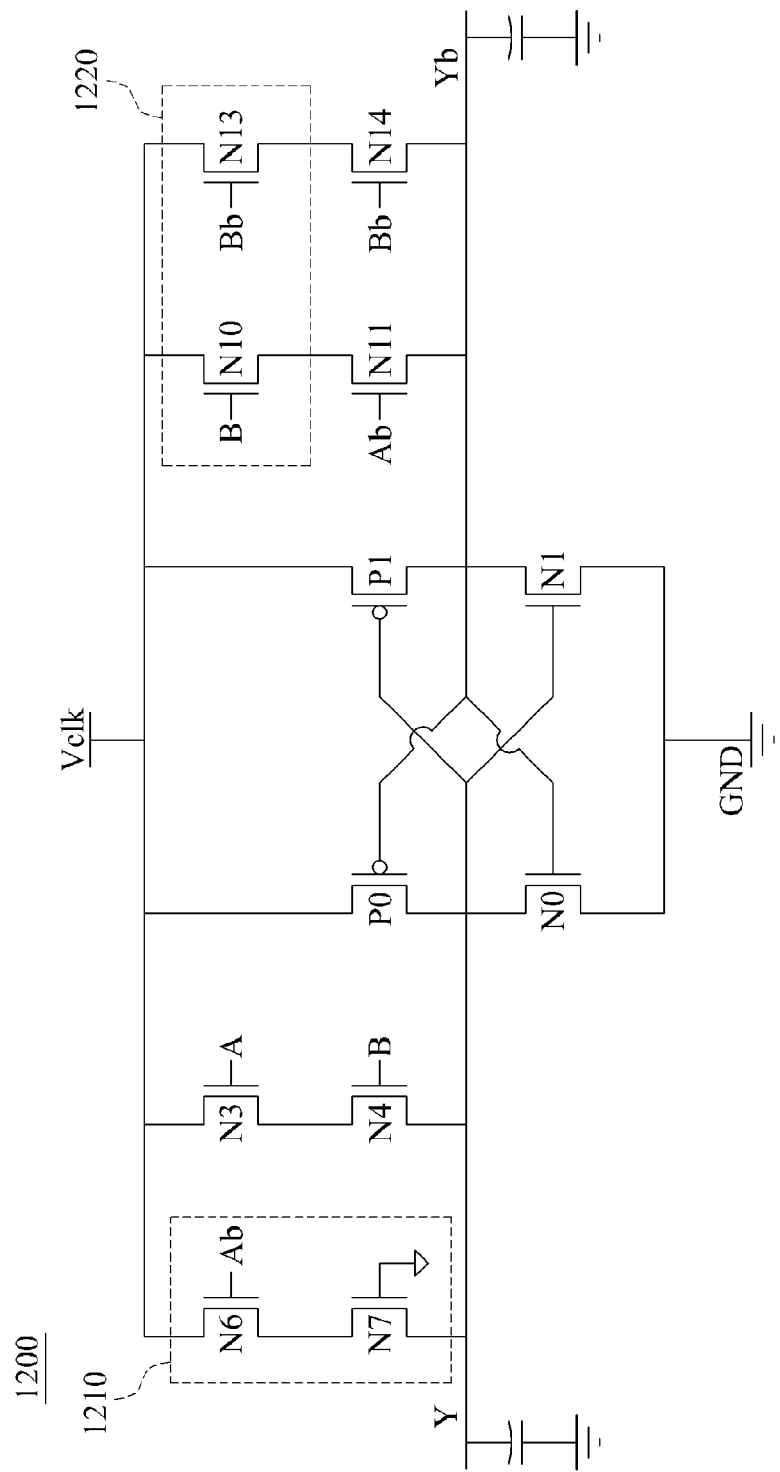
FIG. 12 is a diagram illustrating a logic apparatus in which a first device block is connected to supply symmetry of the adiabatic logic of FIG. 11.

FIG. 12 illustrates a logic apparatus in which a first device block is connected to supply symmetry of the adiabatic logic of FIG. 11.

First, a block 1210 is added as a part of the first device block.

According to logic equations $A*B=0+A*B$ and $0+A*B=(Ab*0)+A*B$, an equation $A*B=(Ab*0)+A*B$ is satisfied. Here, "0" in the logic equation may be implemented by a dummy transistor connected with a grounded input. The reason that a transistor N6 is input with Ab is described with reference to FIG. 3 hereinbefore.

With respect to a block 1220, a logic equation $Ab+Bb=B*Ab+Bb*Bb$ may be easily deduced by altering Equation 2.

Since a NMOS N10 input with B is serially connected to a transistor N11, and an NMOS N13 input with Bb is serially connected to a NMOS N14, symmetry of the logic apparatus 1200 may be guaranteed.

Figure 13:
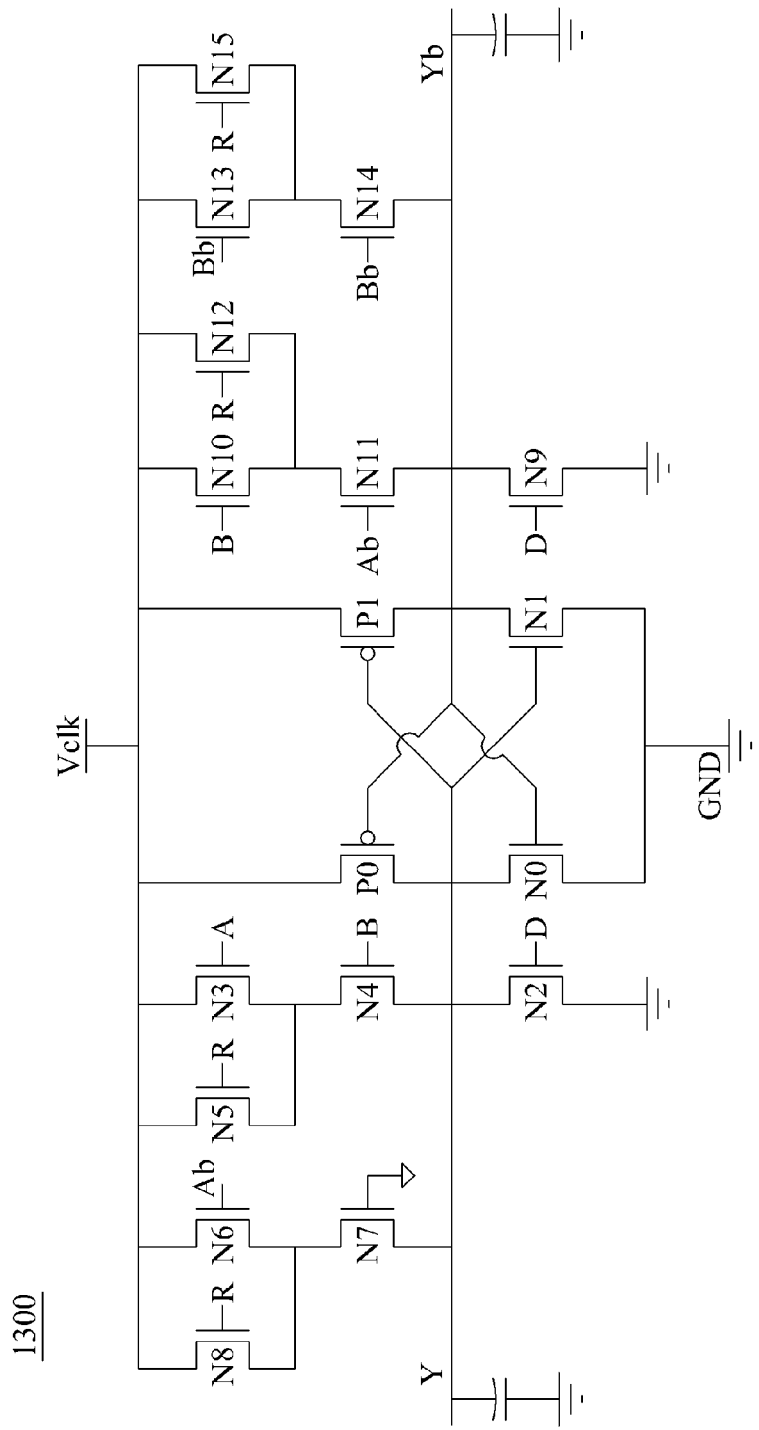
FIG. 13 is a diagram illustrating a logic apparatus in which a second device block for charge adjustment is connected to redistribute charges of each node of the logic apparatus of FIG. 12.

The second device block 130 additionally provided to solve the charge imbalance between nodes of the logic apparatus 1200 is illustrated in an embodiment corresponding to FIG. 13.

FIG. 13 illustrates a logic apparatus 1300 in which a second device block for charge adjustment is connected to redistribute charges of each node of the logic apparatus of FIG. 12.

After a single clock operation, NMOS transistors N5, N8, N12, and N15 are input with a voltage R greater than a threshold voltage, thereby causing a short circuit between respective connected nodes and a power supply Vclk. As a result, charges are recovered. That is, the charge balance may be achieved by the charge recovery method.

NMOS transistors N2 and N9 supply the charge balance by the discharge by grounding output nodes Y and Yb, respectively, after the single clock operation of the logic apparatus 1300.

Thus, when an adiabatic logic block 1100 is additionally connected with the first device block including the block 1210 and the block 1220 and with the second device block including the recovery transistor and the discharge transistor, the logic apparatus 1300 may be secured against the side-channel attack using power analysis.

As described above, the second device block may include the charge sharing element.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A logic apparatus that is secure against a power analysis attack, comprising:
    a clocked power logic configured to recover and reuse at least a part of a charge supplied during a single clock operation;
    a first device block connected to the clocked power logic that adjusts a current path of the clocked power logic so that a pattern of a power supply current is constant regardless of input data; and
    a second device block configured to uniformly distribute charges by readjusting remaining charges in each node of the clocked power logic after the clock operation.

2. The logic apparatus of claim 1, wherein the first device block comprises a dummy transistor which always maintains an off state.

3. The logic apparatus of claim 1, wherein the second device block comprises at least one charge sharing element.

4. The logic apparatus of claim 1, wherein the second device block comprises at least one discharge element.

5. The logic apparatus of claim 1, wherein the second device block comprises at least one charge recovery element.

6. The logic apparatus of claim 1, wherein the clocked power logic is an efficient charge recovery logic (ECRL) type.

7. The logic apparatus of claim 1, wherein the clocked power logic is a 2N-2N2P type.

8. The logic apparatus of claim 1, wherein the clocked power logic is a positive feed-back adiabatic logic (PFAL) type.

9. The logic apparatus of claim 1, wherein the clocked power logic performs any one of logic operations NAND, NOR, XOR, and XNOR.

10. A logic apparatus that is secure against a power analysis attack, comprising:

a clocked power logic configured to recover and reuse at least a part of a charge supplied during a single clock operation, the clocked power logic comprising a circuit that forms a current path for adjusting power consumption to a substantially constant value; and a second device block configured to uniformly distribute charges by readjusting remaining charges in each node of the clocked power logic after the single clock operation.

11. The logic apparatus of claim 10, wherein the second device block comprises at least one charge sharing element.

12. The logic apparatus of claim 10, wherein the second device block comprises at least one discharge element.

13. The logic apparatus of claim 10, wherein the second device block comprises at least one charge recovery element.

14. The logic apparatus of claim 10, wherein the clocked power logic is a 2N-2N2P type.

15. A logic apparatus that is secure against a power analysis attack, comprising:

an efficient charge recovery logic (ECRL) type clocked power logic to perform NAND operation of a first input signal and a second input signal by using two n-type metal oxide semiconductor (NMOS) pull-down networks having duality;

a first device block connected to a first output node and a second output node of the clocked power logic to adjust a current path between the two NMOS pull-down networks so that power consumption becomes constant; and a second device block to redistribute charges of each node in the logic apparatus after the NAND operation.

16. The logic apparatus of claim 15, wherein the first device block comprises a dummy transistor which always maintains an off state.

17. The logic apparatus of claim 15, wherein the second device block redistributes the charges of each node in the logic apparatus by at least one method selected from charge sharing, discharging, and charge recovery.

* * * * *